W. C. ARBOGAST.
COMBINED DRAG AND HARROW.
APPLICATION FILED JAN. 29, 1915.
1,167,969.
Patented Jan. 11, 1916.
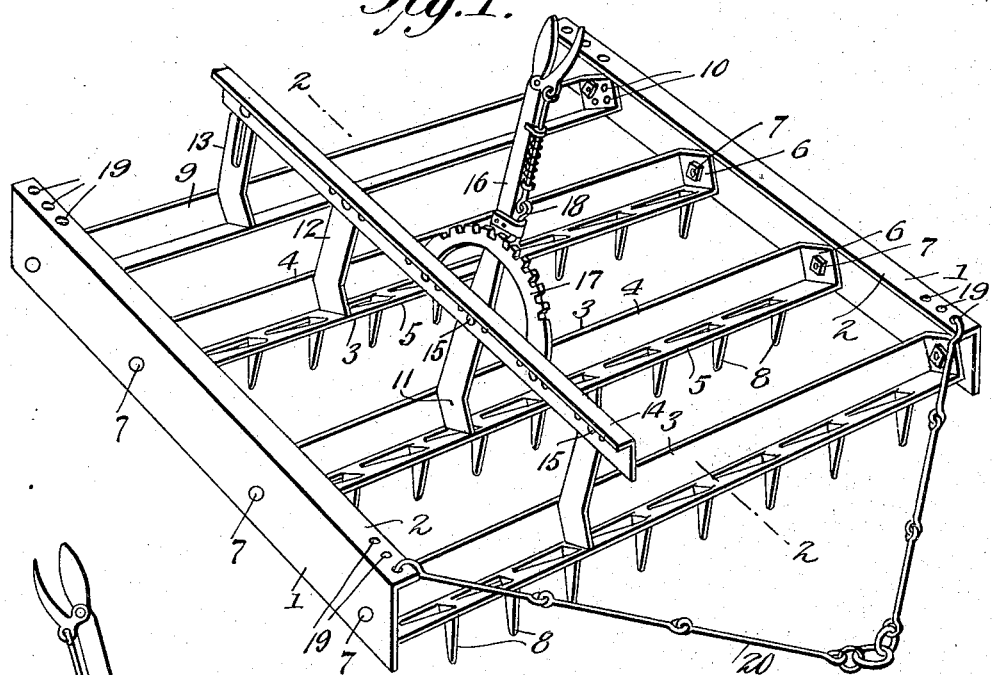
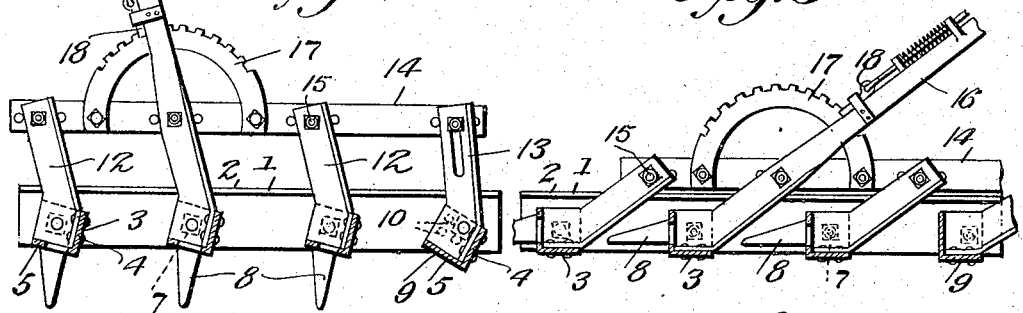
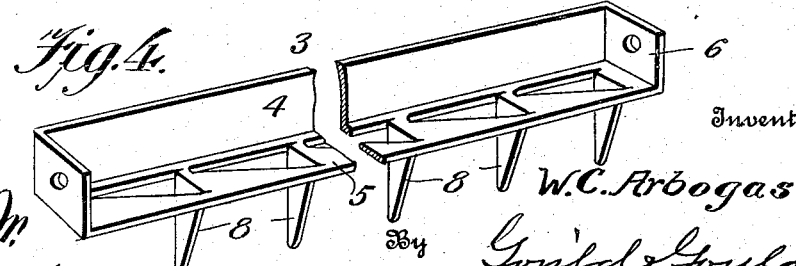

UNITED STATES PATENT OFFICE.

WILLIAM C. ARBOGAST, OF BLANCHESTER, OHIO.

COMBINED DRAG AND HARROW.

1,167,969.  Specification of Letters Patent.  Patented Jan. 11, 1916.

Application filed January 29, 1915. Serial No. 5,021.

*To all whom it may concern:*

Be it known that I, WILLIAM C. ARBOGAST, a citizen of the United States, residing at Blanchester, in the county of Clinton and State of Ohio, have invented certain new and useful Improvements in Combined Drags and Harrows, of which the following is a specification.

The invention relates to a combined harrow and drag constructed with a view to providing an implement which is adjustable to vary the inclination of the harrow teeth or to place said teeth in an inoperative position to provide a drag.

The main object of the present invention is the provision of a combined drag and harrow wherein the tooth bars are of angular formation with the teeth integrally formed from said bars, one angular face of the bars being free of obstruction to provide a drag under certain conditions of adjustment, the capabilities of adjustment permitting the teeth to be used at any angle to the surface over which the implement is traveling.

A further object is the provision of an adjusting means which is in itself capable of variable connection with any one or more of the tooth bars, whereby under certain conditions certain of the bars may be used as drags, while others are used as harrows.

The invention further contemplates the provision of a double ended drag and harrow by which the draft team may be connected at either end to utilize the device in either position.

The invention will be described in the following specification, reference being had particularly to the accompanying drawings, in which:

Figure 1 is a perspective view of the improved drag and harrow. Fig. 2 is a transverse section on line 2—2 of Fig. 1. Fig. 3 is a transverse section with the bars shown in use as drag bars. Fig. 4 is a perspective view of one of the tooth bars.

The improved harrow is constructed entirely of metal and involves duplicate side bars 1 and upper edges inturned as at 2 for a purpose which will later appear.

The tooth bars 3 are of identical formation comprising appropriate lengths of material of angular form, that is presenting portions 4 and 5 at right angles to each other, the ends having bearing walls 6 designed to bear against the inner surface of the side bars and to be pivotally connected thereto through the medium of pivot bolts 7, as shown. One portion as 4 of the tooth bars is plain or smooth throughout its length, providing what is hereinafter termed the drag face of the bar. The other portion as 5 of the tooth bar is formed with a series of spring teeth 8 provided by suitably cutting the tooth face 5 and bending the cut portion at an approximate right angle to such face. The cut portion is preferably of triangular form so that the apex presents the point of the tooth, from which the body gradually widens to its juncture with the bar.

One or more of the tooth bars, so called, is plain in both portions 4 and 5 constituting simply a drag bar, as shown at 9, and in the instance illustrated this bar is disposed at one end of the frame. The end walls 6 of the drag bar are formed with a series of openings 10 to receive the pivot bolts 7 to permit the drag bar to be arranged in any desired adjustment with respect to the end bars and with the remaining tooth bars. I also contemplate this adjustable pivotal support for use with the tooth bars proper, though such is not illustrated.

At a point intermediate the lengths each tooth bar and drag bar is provided with a lug or projection 11, which is extended beyond the bar in the form of a link 12 fixed with relation to, or forming an integral part of the lug 11. The link 13 connected with the drag bar 9 is preferably slotted throughout its upper portion, and this construction may also be applied to the links 12 of the tooth bars. The upper ends of the links are connected by a throw bar 14, through the medium of pivot bolts 15, the connection being adjustable as may be desired through the construction previously described. An operating lever 16 is pivotally connected to one of the links 12 and extended for the purpose, and a notched segment 17 is carried by the throw bar 14, the lever having the usual locking dog 18 for coöperation with the segment. The inturned ledges of the side bars are provided with a series of openings 19 to receive appropriate connections at the ends of a draft chain 20, whereby the draft animals may be readily connected to either end of the implement.

As constructed and arranged it will be obvious that I have provided a series, any number being contemplated, of tooth bars which are formed with integral spring teeth and a single drag bar at one end. Through the use of the lever 16 the teeth may be turned at any inclination to the surface over which they are traveling, though in all such adjustments the drag bar serves the purpose of a drag. The tooth bars may be adjusted to a full limit in one direction so that the plain or drag faces 5 thereof operate on the surface of the ground so that the entire structure becomes a drag. Furthermore by attaching the draft team to one end the drag bar may be in advance of the tooth bars, or, through the attachment of the draft animals to the opposite end the drag bar will follow the tooth bars.

The teeth form a very important part of the structure, owing to the fact that they are integrally constructed from comparatively thin angle steel bars. By this arrangement the teeth are at all times in cutting condition, that is maintaining a cutting edge, never requiring sharpening, and the loss of a tooth is impossible except by breakage, which latter is highly improbable owing to the spring connection and edge operation of the teeth.

With the combined implement a material saving in time is secured over that required by the old method of preparing a bed, as the operator can drag and harrow at the same time, adjusting the teeth at any desired angle so as to harrow to a proper depth in accordance with conditions required. Furthermore the implement is constructed entirely of metal rendering it practically indestructible and the adjustments simplify materially the work of arranging the parts for the particular operation required.

What is claimed is:

1. A combined drag and harrow including tooth-bars and drag bars each constructed of angle strips, the tooth bars having integral teeth struck from one plane of such bars.

2. A combined drag and harrow including tooth bars and drag bars each constructed of angle strips, the tooth bars having integral teeth struck from one plane of such bars, and means for adjusting said bars to present distinct surfaces to the ground surface.

3. A combined drag and harrow including tooth bars and drag bars each constructed of angle strips, the tooth bars having integral teeth struck from one plane of such bars, and means for simultaneously adjusting all of said bars to present distinct surfaces to the ground surfaces.

4. A combined drag and harrow including side bars, angle bars pivotally supported by and between said side bars, certain of said angle bars presenting both toothed surfaces and drag surfaces.

5. A combined drag and harrow including side bars, angle bars with right angled surfaces pivoted between the side bars, one of the angle bars having both right angled surfaces unbroken to form a drag bar, others of the angle bars having one surface each formed with integral teeth to present combined harrow and drag bars.

In testimony whereof, I affix my signature in presence of two witnesses.

WILLIAM C. ARBOGAST.

Witnesses:
W. W. BURK,
JOHN W. BARRETT.

Copies of this patent may be obtained for five cents each, by addressing the "Commissioner of Patents, Washington, D. C."